UNITED STATES PATENT OFFICE.

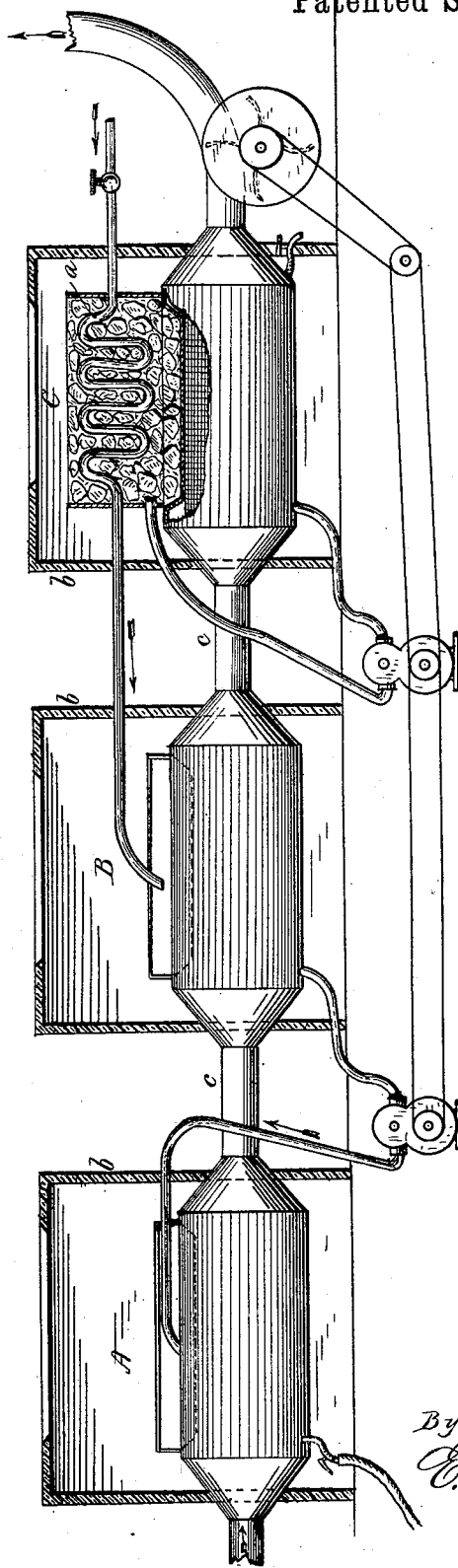

RALPH S. JENNINGS, OF BALTIMORE, MARYLAND.

AIR-COOLING APPARATUS.

SPECIFICATION forming part of Letters Patent No. 247,253, dated September 20, 1881.

Application filed August 5, 1881. (No model.)

*To all whom it may concern:*

Be it known that I, RALPH S. JENNINGS, a citizen of the United States of America, residing at Baltimore, in the county of Baltimore and State of Maryland, have invented certain new and useful Improvements in Air-Cooling Apparatus; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain new and useful improvements in a method of and means for supplying a cooling medium to the screens of air-cooling apparatuses, in an effective and economical way of utilizing the refrigerant medium, whereby the best results are obtained with the smallest loss, which method consists in passing the water or other liquid used to moisten and cool the screens in the first cold-air chambers through a refrigerant medium of the last chamber, whereby the refrigerant medium of the last chamber is not only employed to lower the temperature of the last chamber, but also to lower the temperature of the liquid which is supplied to cool the other chambers.

In carrying out this method, my invention consists in the employment of the hereinafter-described mechanical means, which consist, principally, in providing the tank (which is located above the last cold-air chamber, which is intended to receive a refrigerant of exceedingly-low temperature, such as ice and salt) with a serpentine pipe, which receives a supply of liquid from an ordinary source, the temperature of which liquid in passing through the serpentine pipe or tank (which is surrounded by the refrigerant) has its temperature lowered, and is delivered as a cooling medium to the screens in the chambers preceding the last cold-air chamber. My invention also consists in providing the air-chambers and tanks with non-conducting jackets, and in the combination of the means herein described and more especially claimed.

On the annexed drawings, Figure 1 is a vertical longitudinal section, in which I have shown one practical way of carrying out my invention; but it is evident that the construction and arrangement therein shown can be varied without departing from the spirit of my invention.

A, B, and C represent cold-air chambers, which are provided internally with vertical longitudinal screens and perforated pans for pipes, above which are arranged tanks for the reception of the refrigerant medium.

The arrangement of the screens, pans, and tanks, as herein shown, has formed the subject-matter of a previous application, and no claim to the same is made in this application.

Within the tank, which is located over the cold-air chamber C, are placed ice and salt, which surround a serpentine pipe, $a$, of thin material, through which a supply of water passes from a usual source, as a hydrant. The water in passing through the pipe $a$ becomes cooled, the pipe $a$ discharges in the tank over the cold-air chamber B, and is distributed from the tank into a pan or pipe, from which it drips upon the fibrous screens in the chamber B. The water which collects in the bottom of the chamber B is pumped into the tank above the chamber A, and is distributed in a similar manner. The drippings which collect in the bottom of the chamber C from the tank above it are pumped back into the tank, and again fed upon the fibrous screens. When an excess of water collects in the first and last cold-air chambers it may be allowed to escape through stop-cocks or openings near the bottom of the chambers.

The chambers A, B, and C are surrounded with non-conducting jackets $b$, and the connecting-pipes $c$ are covered with non-conducting material.

The exit-pipe from the last cooling-chamber is provided with a suction and force pump or fan which is driven by a suitable motor, which motor is used directly or indirectly to drive the pumps.

It is evident that the number of cold-air chambers may be increased or diminished without departing from the spirit of my invention. The operation of this invention is simple, and may be described as follows: The air at the temperature of the atmosphere enters the first chamber, A, by the induction-pipe shown, and is drawn between and over the fibrous screens, which are moistened with cold water, which is supplied from the chamber B by the pump. The air then passes through the connecting-tube into the chamber B, where it comes in contact with similar screens, which are moistened with water of a lower temperature, which is supplied from the serpentine pipe, which is surrounded with the refrigerant in the tank over the chamber C. The air then leaves the chamber and enters the chamber C, where its temperature is further reduced. It is then forced into the apartment to be cooled.

By this arrangement of the air-cooling chambers in consecutive order the temperature of the air in its passage through the chambers is gradually reduced, and a saving of ice is effected.

What I claim as new, and desire to secure by Letters Patent, is—

1. The process or method of cooling air in apartments and similar places, which consists in passing the air to be cooled through a series of air-cooling chambers in consecutive order, so that the temperature of the air in its passage through the chambers is gradually reduced by water or other liquids in moistening and cooling a series of fibrous screens, which liquid has been cooled by a refrigerant medium, substantially as described.

2. The improvement in the process or art of cooling air for apartments and like purposes, which consists in passing the water or other liquid used in moistening and cooling the fibrous screens in a cold-air chamber through a refrigerant medium of the last chamber of a series, whereby the refrigerant medium of the last chamber is not only employed to lower the temperature of the last chamber, but also to lower the temperature of the liquid which is supplied to cool the other chambers, substantially as described.

3. In combination, with a cold-air apparatus provided with an ice-box, a serpentine pipe located within the ice-box and connected with a preceding cold-air chamber, substantially as described.

RALPH S. JENNINGS.

Witnesses:
 F. L. OURAND,
 E. A. DICK.